(12) United States Patent
Roy

(10) Patent No.: US 10,320,901 B2
(45) Date of Patent: Jun. 11, 2019

(54) CONTEXTUAL INFORMATION FOR A PEER-TO-PEER NETWORK

(71) Applicant: The United States of America, as represented by the Secretary of the Army, Washington, DC (US)

(72) Inventor: Radhika Roy, Howell, NJ (US)

(73) Assignee: The United States of America, as represented by the Secretary of the Army, Washington, DC (US)

( * ) Notice: Subject to any disclaimer, the term of this patent is extended or adjusted under 35 U.S.C. 154(b) by 518 days.

(21) Appl. No.: 14/948,862

(22) Filed: Nov. 23, 2015

(65) Prior Publication Data

US 2017/0149882 A1    May 25, 2017

(51) Int. Cl.
*G06F 15/173* (2006.01)
*H04L 29/08* (2006.01)
*H04L 12/751* (2013.01)
*H04L 12/743* (2013.01)
*H04W 84/18* (2009.01)

(52) U.S. Cl.
CPC .......... *H04L 67/1065* (2013.01); *H04L 45/02* (2013.01); *H04L 45/7453* (2013.01); *H04W 84/18* (2013.01)

(58) Field of Classification Search
USPC ......................................................... 709/223
See application file for complete search history.

(56) References Cited

U.S. PATENT DOCUMENTS

2010/0103870 A1 * 4/2010 Garcia-Luna-Aceves ................... H04L 45/306
370/328

* cited by examiner

*Primary Examiner* — Hee Soo Kim
(74) *Attorney, Agent, or Firm* — Ronald Krosky; Azza Jayaprakash

(57) ABSTRACT

Various embodiments are described that relate to network communication. In a mobile peer-to-peer ad hoc network, nodes can use a context-aware key-based distribution hash table routing algorithm to create the route scheme. This can be done among nodes that are cluster-heads while nodes that are within a cluster can use a non-context based algorithm.

20 Claims, 10 Drawing Sheets

CONTEXTUAL INFORMATION FOR A PEER-TO-PEER NETWORK

GOVERNMENT INTEREST

The innovation described herein may be manufactured, used, imported, sold, and licensed by or for the Government of the United States of America without the payment of any royalty thereon or therefor.

BACKGROUND

People that are far away from one another can have a desire to communicate with one another. A person can use a mobile device, such as a cellular telephone or a radio, to communicate with another person using a similar device. In one example, a group of soldiers can communicate with one another through use of portable radios. These portable radios can, at least in part, form a mobile ad hoc network.

SUMMARY

In one embodiment, a system comprises a context component and a route component. The context component can configured to gather a contextual information set for a peer-to-peer ad hoc network. The route component can be configured to create a route scheme for information communication in the peer-to-peer ad hoc network, where the creation of the route scheme is based, at least in part, on the contextual information set In another embodiment, a method comprises obtaining a data set about a peer-to-peer network. The method also comprises developing, by way of a development processor, a context-based integrated peer-to-peer algorithm for the peer-to-peer ad hoc network through use of the data set. The context-based integrated peer-to-peer algorithm forwards route traffic management in the peer-to-peer ad hoc network.

In yet another embodiment, a system comprises a non-transitory computer-readable medium and a processor. The non-transitory computer-readable medium can be configured to retain a context-aware key-based distribution hash table routing algorithm. The processor can be configured to use the context-aware key-based distribution hash table routing algorithm to create an initiation protocol for a mobile peer-to-peer ad hoc network.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Figure 1:
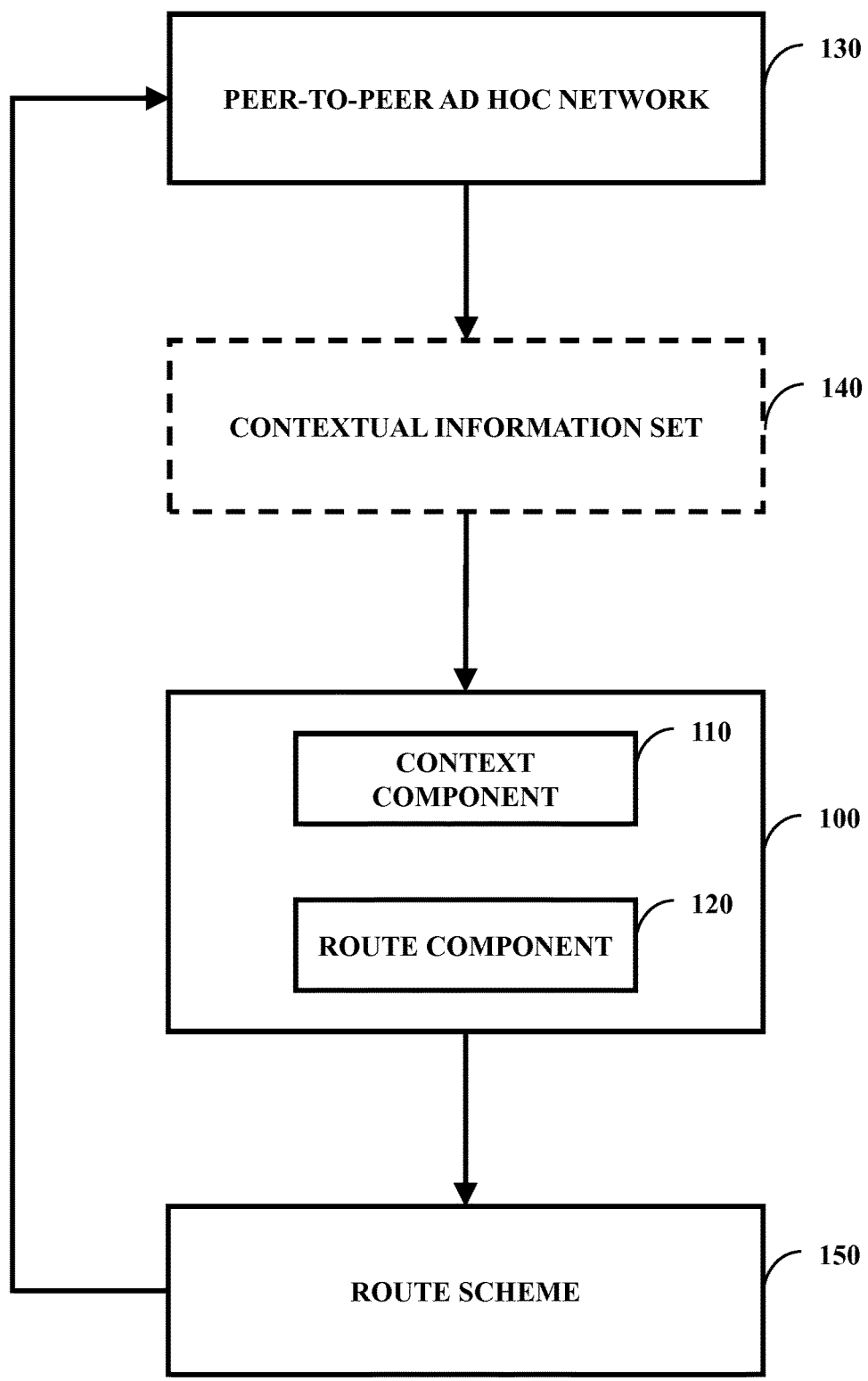
FIG. 1 illustrates one embodiment of a system comprising a context component and a route component.

In one embodiment, a plurality of devices (e.g., mobile devices and/or fixed wired devices) can form a peer-to-peer network, such as an ad hoc peer-to-peer network or a mobile ad hoc network. When routing information along the peer-to-peer network in correspondence to different logical layers (e.g., application, transport, network, or link), such as layers defined by an open systems interconnection (OSI) standard, contextual information for the network (e.g., devices of the network, locations of nodes, locations of users, distances, links, bandwidths, qualify of service, connectivity, preferences, functionalities, features, or security requirements) can be used to determine how to route the information, such as when the network is faced with high churn rates. With this, a context-aware key-based distributed hash table routing algorithm can be used to route traffic in the peer-to-peer network.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action (s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs including separate applications or code from dynamically linked libraries.

Figure 2A:
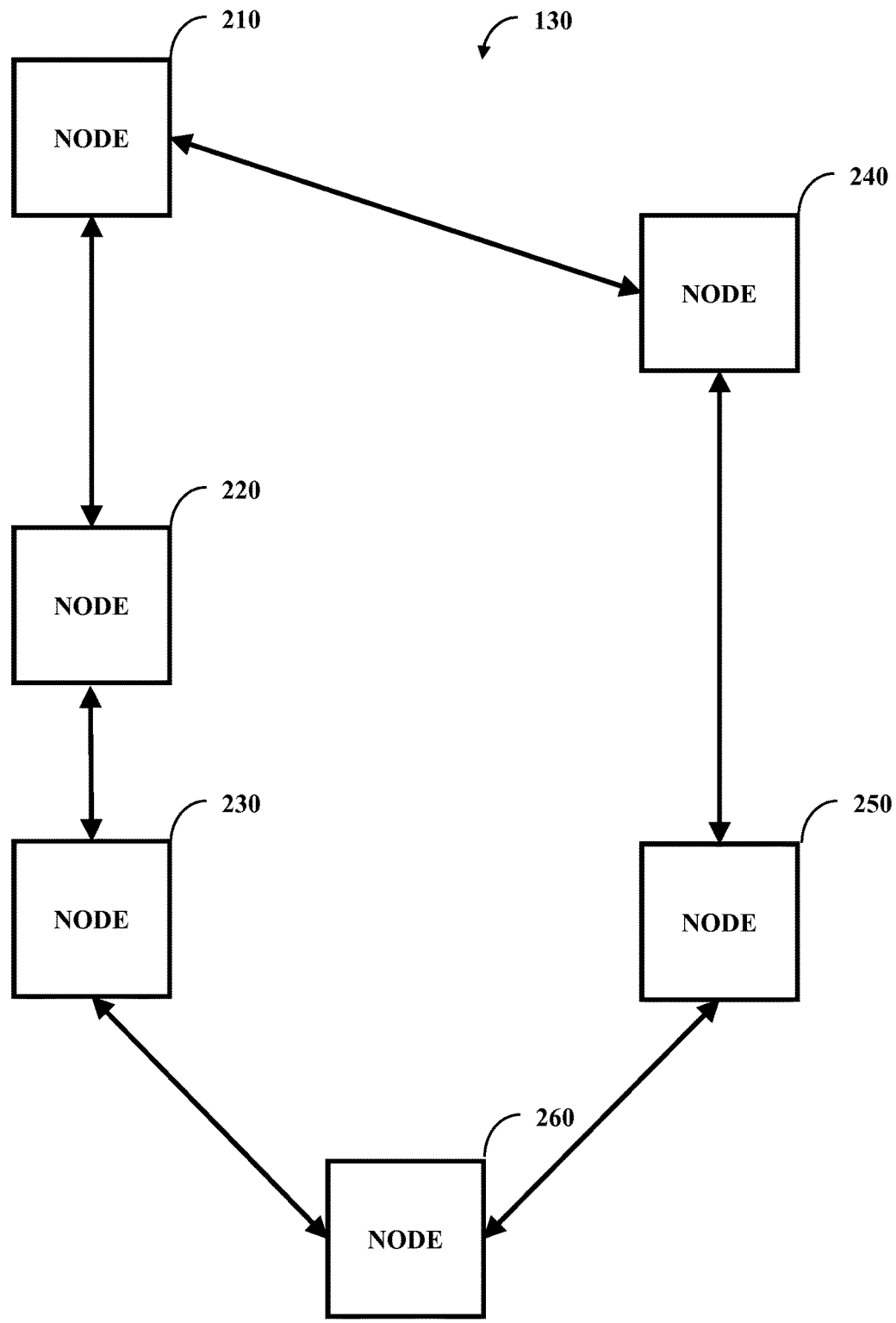
FIGS. 2A and 2B illustrate two embodiments of the peer-to-peer network with six nodes.
Figure 2B:
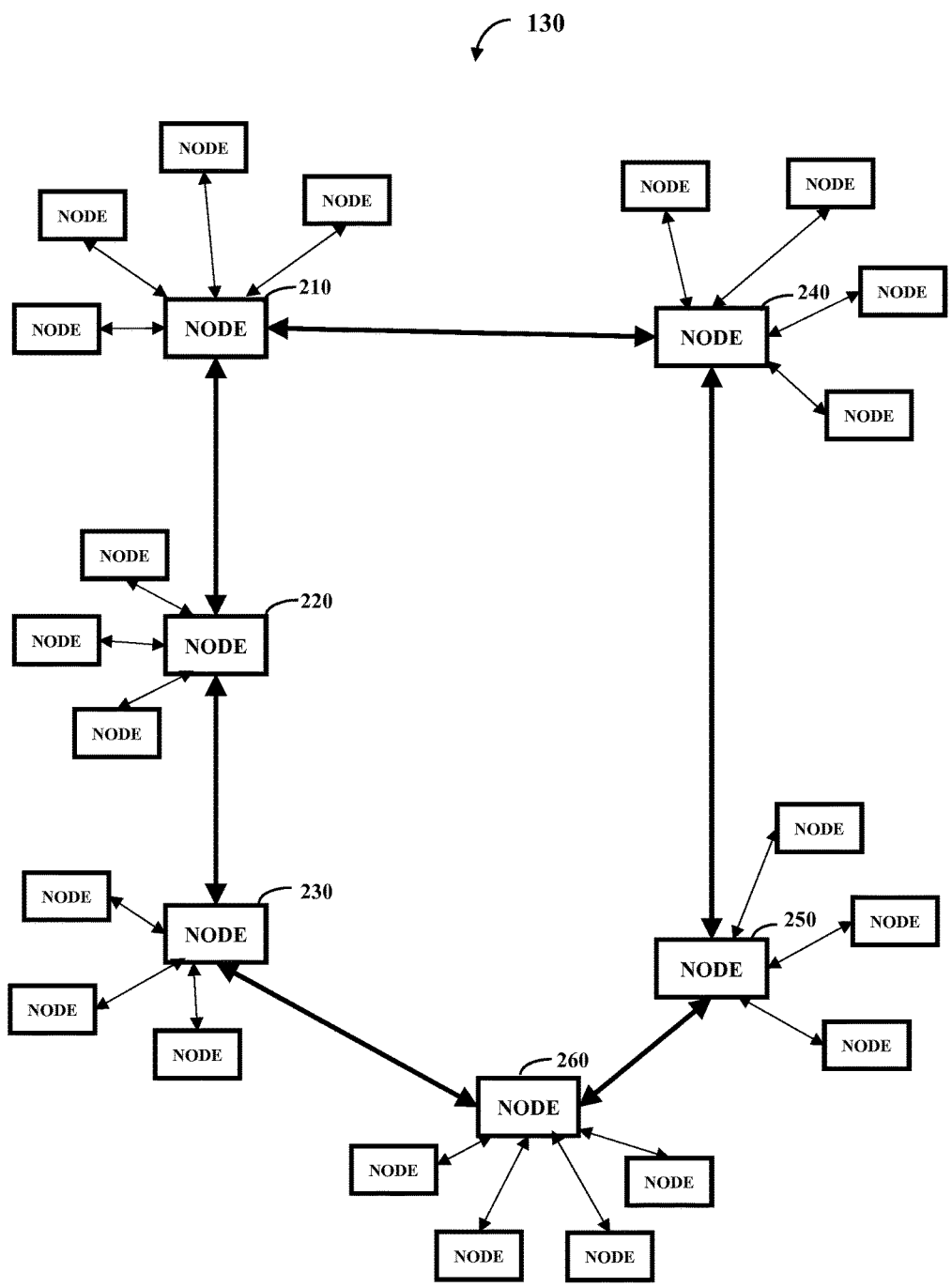

FIG. 1 illustrates one embodiment of a system 100 comprising a context component 110 and a route component 120 and FIG. 2 illustrates one embodiment of a peer-to-peer ad hoc network 130 (with six nodes 210-260) that is also illustrated in FIG. 1. FIG. 2 is an omnibus term to encompass FIG. 2A and FIG. 2B. FIG. 2A illustrates the network 130 with individual nodes 210-260 while FIG. 2B illustrates the network 130 with node clusters and the individual nodes 210-260 functioning as cluster heads. The system 100 can function with different networks, including those illustrated in FIGS. 2A and 2B.

The context component 110 can be configured to gather a contextual information set 140 for the peer-to-peer ad hoc network 130. The route component 120 can be configured to create a route scheme 150 for information communication in the peer-to-peer ad hoc network 130. Creation of the route scheme 150 can be based, at least in part, on the contextual information set 140.

The peer-to-peer ad hoc network 130 can comprise various nodes (e.g., devices) that communicate with one another. While six nodes 210-260 are illustrated, more or less than six nodes can be used. Further, while individual nodes are illustrated as directly connecting with two other nodes, various other communication patterns can be used. These nodes 210-260 can move independently, enter and leave the network 130 on their own at various and sometimes unexpected times, and have individual characteristics such as reliability, security, and importance.

To route traffic among nodes, a random key-based distributed hash table (DHT) routing algorithm can be used. This random algorithm can randomly assign a path, say from node 210 to node 260. However, this random algorithm can have multiple drawbacks. In one example, two information packets can be designated for transmission from node 210 to node 260. With the random algorithm, the first packet could travel node 210 to node 220 to node 230 to node 260 and the second packet could travel node 210 to node 240 to node 250 to node 260. However, node 240 can have a contextual circumstance making it less desirable for transmission while node 220 can have a contextual circumstance making it more desirable for transmission. In one example, node 240 can be physically moving away from the network 130 such that the node 240 may leave the network 130 and/or may be more prone to losing transmission packets. Meanwhile, node 220 can be more stationary than node 240, meaning failure is less likely.

Therefore, as opposed to using a random-based algorithm, the route component 120 can use a context-aware key-based distributed hash table routing algorithm to create the route scheme. With this, the contextual information for the nodes 220 and 240 can be taken into account. The contextual information for the nodes 220 and 240 can be part of the contextual information set 140. That way, instead of randomly selecting if node 220 or node 240 is better suited for transmission, contextual information of those nodes can be considered and based on that contextual information a better choice can be made.

The contextual information set 140 can be quantitative information (objective) of the peer-to-peer ad hoc network 130 and/or qualitative information (subjective) of the peer-to-peer ad hoc network. Example quantitative information can include distance between nodes, performance, storage, and/or processing power while example qualitative information can be media bridging data or call signaling data. In addition to having qualitative and/or quantitative characteristics, the contextual information set 140 can be information on different logical layers (e.g., per OSI terminologies) of the peer-to-peer ad hoc network 130. In one example, the contextual information set 140 is, at least in part, information of a peer-to-peer session initial protocol layer of the peer-to-peer ad hoc network 130. In another example, the contextual information set 140 is, at least in part, information of a mobile ad hoc layer of the peer-to-peer ad hoc network 130 when the peer-to-peer ad hoc network 130 is a mobile peer-to-peer ad hoc network.

Various implementations of the peer-to-peer ad hoc network 130 can be used. In one example, the peer-to-peer ad hoc network is a decentralized peer-to-peer ad hoc network. This decentralization causes the network 130 to function without a central server and therefore without a server-client relationship. This is an example of the network 130 being a mobile peer-to-peer ad hoc network.

While the nodes 210-260 of the peer-to-peer ad hoc network 130 are discussed as individual nodes, at least one of these nodes 210-260 can be a node cluster. The individual node clusters can comprise a cluster head and at least one ordinary node (non-cluster head node). The route scheme 150 can be a first route scheme for information communicated from one cluster head to another. The route component 120 can be configured to create a second route scheme for information communicated from one ordinary node to another ordinary node (e.g., within a node cluster) through use of a non-context-aware key-based distribution hash table routing algorithm. With this, the context-aware algorithm can be used for traffic from cluster-to-cluster when traffic goes from head-to-head and heads disseminate information to their ordinary nodes. Meanwhile, ordinary node-to-ordinary node communication within a cluster can use the random based algorithm.

Figure 3:
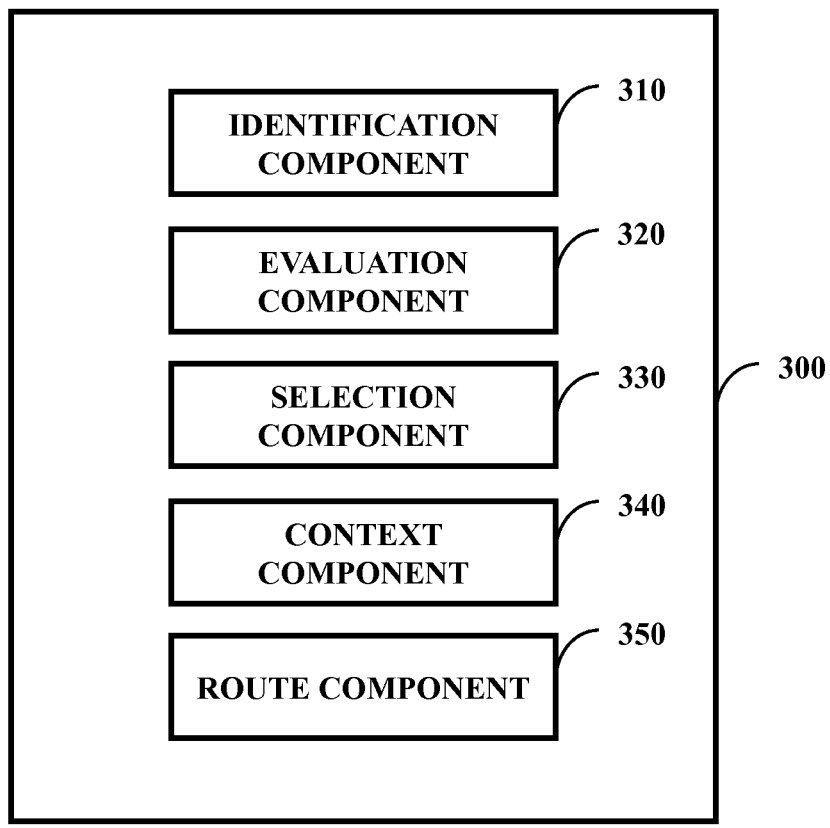
FIG. 3 illustrates one embodiment of a system comprising an identification component, an evaluation component, a selection component, a context component, and a route component.

FIG. 3 illustrates one embodiment of a system 300 comprising an identification component 310, an evaluation component 320, a selection component 330, the context component 110, and the route component 120. The identification component 310 can be configured to identify a transmission node (e.g., the node 210 of FIG. 2 being identified as the transmission node) and a destination node (e.g., the node 260 of FIG. 2 being identified as the destination node) of the peer-to-peer ad hoc network 130 of FIG. 1. The evaluation component 320 can be configured to evaluate a first node (e.g., the node 220 of FIG. 2) of the peer-to-peer ad hoc network 130 of FIG. 1 and evaluate a second node (e.g., the node 240 of FIG. 2) of the peer-to-peer ad hoc network 130 of FIG. 1 to produce an evaluation result. This evaluation can be, at least in part, with regard to the contextual information set 140 of FIG. 1. The selection component 330 can be configured to make a selection of the first node, the second node, or a combination thereof and the selection can be based, at least in part, on the evaluation result. The route scheme 150 of FIG. 1 indicates a path from the transmission node to the destination node by way of the node indicated in the selection.

In one example, a message can be designated for communication from node 210 of FIG. 2 to node 260 of FIG. 2. The identification component 310 can receive and receive a request for transmission. In reading this request the identification component 310 can determine the transmission and destination nodes. In response to this, the context component 340 can gather contextual information for the nodes 210-260 of FIG. 2. The evaluation component 320 can evaluate this contextual information on a node-by-node basis. For example, packet transmission success rates for the nodes 220-250 of FIG. 2 can be calculated. The selection component 330 can try to find a superior path from node 210 of FIG. 2 to node 260 of FIG. 2. Different standards can be used, such as a higher average success rate or a highest worst node success rate and which standard to be used can be determined by the selection component 330. Once the selection component 330 selects a path (e.g., node 210 to node 220 to node 230 to node 260 all of FIG. 2), the route component 120 can create (e.g., designate or choose) the route scheme 150 with the path. While a singular standard for a singular contextual factor is discussed (e.g., success rates of two possible paths), more complex arrangements can be practiced.

Figure 4:
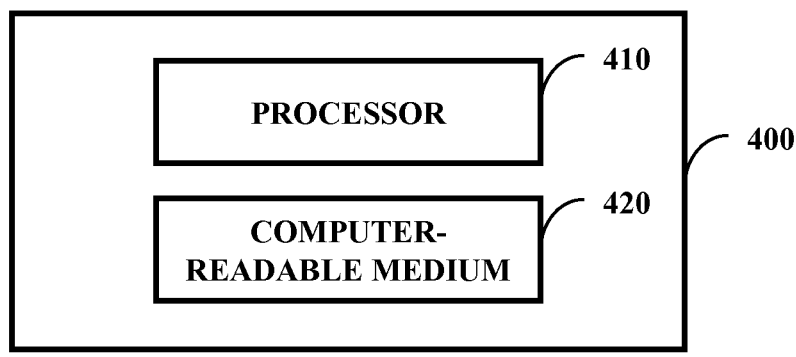
FIG. 4 illustrates one embodiment of a system comprising a processor and a computer-readable medium.

FIG. 4 illustrates one embodiment of a system 400 comprising a processor 410 (e.g., a general purpose processor or a processor specifically designed for performing at least part of the functionality disclosed herein) and a computer-readable medium 420 (e.g., non-transitory computer-readable medium). The computer-readable medium 420 can be configured to retain the context-aware key-based distribution hash table routing algorithm. The processor 410 can be configured to use the context-aware key-based distribution hash table routing algorithm to create an initiation protocol for communication in a mobile peer-to-peer ad hoc network (e.g., the peer-to-peer ad hoc network 130 of FIG. 1).

As discussed above with regard to FIG. 2, the peer-to-peer ad hoc network 130 of FIG. 2B can comprise nodes 210-260 that are node clusters. The individual node clusters can comprise a cluster head and at least one ordinary node. The processor 410 can use the context-aware key-based distribution hash table routing algorithm to create an initiation protocol between cluster heads. Information communication between ordinary nodes (e.g., of a cluster) can use a non-context-aware key-based distribution hash table routing algorithm or other algorithm (e.g., an open state link routing protocol routing algorithm) to create an initiation protocol for within a cluster.

In one embodiment, the computer-readable medium 420 is communicatively coupled to the processor 410 and stores a command set executable by the processor 410 to facilitate operation of at least one component disclosed herein (e.g., the context component 110 of FIG. 1). In one embodiment, at least one component disclosed herein (e.g., the route component 120 of FIG. 1) can be implemented, at least in part, by way of non-software, such as implemented as hardware by way of the system 400. In one embodiment, the computer-readable medium 420 is configured to store processor-executable instructions that when executed by the processor 410 cause the processor 410 to perform a method disclosed herein (e.g., the methods 500-900 addressed below).

Figure 5:
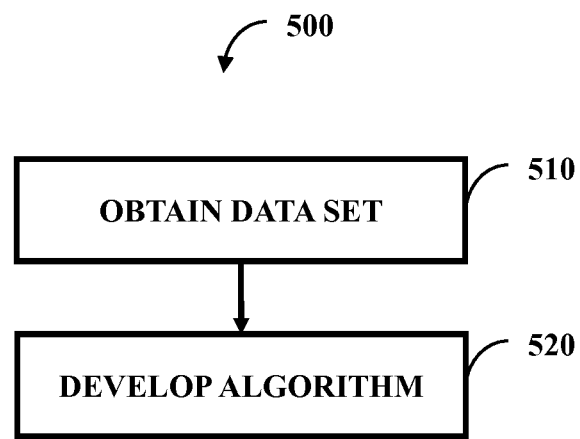
FIG. 5 illustrates one embodiment of a method comprising two actions.

FIG. 5 illustrates one embodiment of a method 500 comprising two actions 510-520. At 510, obtaining a data set about the peer-to-peer ad hoc network 130 of FIG. 1 can occur. At 520, developing, by way of a development processor, a context-based integrated peer-to-peer algorithm for the peer-to-peer ad hoc network 130 of FIG. 1 through use of the data set can occur. The context-based integrated peer-to-peer algorithm can forward (e.g. cause or facilitate) route traffic management in the peer-to-peer ad hoc network.

The nodes 210-260 of FIG. 2 can communicate in an autonomous peer-to-peer environment. A Peer-to-Peer Session Initiation Protocol (e.g., route scheme 150 of FIG. 1) can be used for Voice-over-Internet Protocol (VoIP) and can be made suitable to run over the peer-to-peer ad hoc network 130 of FIG. 1. When the network 130 of FIG. 1 is a mobile ad hoc network, individual nodes 210-260 of FIG. 2 can move independent of other nodes, communicate inherently in a peer-to-peer mode, and the churn-rates of nodes can be very high. Using the random distributed hash table algorithm may not be suitable for mobile ad hoc networks that have very high churn rates. Therefore, the context-aware key-based distributed hash table routing algorithm can be used for a Peer-to-Peer Session Initiation Protocol (P2PSIP) in view of the high churn rates. Embedding intelligence of churns, call setup requirements, and other parameters within routing algorithms can make routing much more efficient.

A mobile ad hoc networks (MANET) can function as the peer-to-peer ad hoc network 130 of FIG. 1. Protocol architectures at different layers (e.g., a physical layer and an application layer) can be peer-to-peer. Peer-to-peer VoIP applications, such as application that use P2PSIP, can be used in industry. P2PSIP can coexist with other protocols, such as client/server Session Initiation Protocol (C/S SIP). Running P2PSIP on the MANET can be challenging since the topology of the MANET is dynamically created and broken due to the mobile conditions that arise due to the mobile nature of the MANET.

The context-aware key-based distribution hash table routing algorithm manage specific information of the P2PSIP application layer as well as the MANET network layer. In one example, P2PSIP nodes can have quantitative (e.g. locations of nodes, locations of users, links, bandwidths, qualify of service, connectivity, preferences, functionalities, features, security requirements, distances, performance, storage, processing power) and/or qualitative (e.g. media bridging, call signaling, firewall) features from an application layer point of view. MANET nodes can also have some similar quantitative (e.g. mobility pattern, delay/jitter/packet-loss, velocity, battery power/energy, link bandwidth) and/or qualitative (e.g. unicast, broadcast, multicast) features from a network layer point of view. The context-aware key-based distribution hash table routing algorithm can account for these features. As a result, the context-aware key-based distribution hash table routing algorithm is not only efficient for taking care of severe-churn rates of a MANET node, the algorithm is also efficient in improving (e.g., optimizing) network resources from the application layer to the network layer for routing, object storage, and object retrieval. Through using the context-aware key-based distributed hash table routing algorithm the network 130 of FIG. 2 can function without a centralized server (e.g., with the nodes 210-260 of FIG. 2 being P2PSIP nodes and/or MANET nodes). The algorithm can use a distributed hash table that can leverage a distributed database in use.

For an application layer of the network 130 of FIG. 2, the overlay topology of the nodes 210-260 of FIG. 2 can be arranged in a partly connected graph. Individual nodes can be assigned a numeric node identity (Node-ID) which, together with a specific overlay algorithm that is specific to a MANET in use, can determine a node's position and a set of nodes the node in question connects to. The network 130 of FIG. 2 can be not only a messaging network, but also a storage network (e.g., a storage network designed for small-scale storage, suitable enough for many MANET nodes, rather than for bulk storage of large objects). Records can be stored under numeric addresses, and peer nodes can store data associated with addresses in a manner related to their Node-ID.

Major components of a peer-to-peer VoIP application layer overlay protocol architecture integrated with the MANET can be, for example, a Usage Layer, Message Transport, Storage, Message Transport, Topology Plug-In, and Forwarding and Link Management Layer. In one example, the Message Transport functionality can use the context-aware key-based distribution hash table routing algorithm and when a Topology Plug-in is responsible for implementing the specific overlay algorithm being used, the Plug-in can use the context-aware key-based distribution hash table routing algorithm. Two layers of routing can occur: Logical routing among the cluster nodes and Physical MANET routing protocols among the Peer Physical nodes and different algorithms can be used in this routing.

A MANET network layer can use a two-step routing approach to route traffic: a combination of peer-to-peer key-based logical distribution hash table routing and MANET physical routing. The distribution hash table routing can be used between chosen nodes (e.g., among cluster heads) while the MANET Physical Routing can be used elsewhere (e.g., among ordinary nodes that are not cluster heads). This can allow for large-scale MANET topology to be scalable.

In using distribution hash table logical routing in the MANET network layer, context-based unicast distribution hash table routing can be used exclusively among the chosen peers (e.g. cluster-heads) over a backbone network while a broadcast can be limited to an access network that can use broadcast-based MANET physical routing protocols. In one example a context-aware logical distributed hash table routing protocol can be used among the cluster heads that form a backbone network as illustrated in FIG. 2B (the network 130 of FIG. 2B being the backbone network). Individual ordinary nodes that form an access network reporting to a cluster head can communicate using the exiting MANET physical routing algorithm (e.g. OLSR) in the case of MANET or other routing protocol (e.g. open short path first (OSPF) physical routing protocol) in case of the non-MANET network. The same the key-based distribution hash table logical routing protocol that is used by the peer-to-peer MANET can also be used by the P2PSIP application as discussed with regard to the application layer with little or no modifications. To put another way, the same context-based algorithm (e.g., distributed hash table routing algorithm) can be used to create the route scheme 150 of FIG. 1 and be used for routing of traffic in the network layer among the cluster heads that form the backbone network of FIG. 2B while the ordinary nodes in individual access networks can use an existing physical routing protocol (e.g., non-context based). Using the same context-aware key-based distribution hash table routing algorithm and/or the same protocol in both application and network layer can further optimize the use of over network resources since, for example, less storage would be used to retain multiple algorithms and/or less processing could occur do to having one protocol.

Peer nodes can be chosen (e.g., by system 300 of FIG. 3) and these chosen peers can use the context-aware key-based distribution hash table routing algorithm for routing. With this, context of the nodes can be used determine if a node is considered a peer node or not (e.g., a cluster head node or not). Example contextual factors can include geographical distance, SIP URI (session initiation protocol uniform resource identifier), dialed number (alias), being a preferred node, geography (e.g. plains, terrains), delay (e.g., call setup, media forwarding, propagation, queuing, processing), security, service capability (e.g. audio, video, and/or data-bridging/switching/sharing), wireless link performances, and mobility patterns. In one example, the following assumptions can be made with regard to choosing a peer node:

$x_i^j$=Criterion x of peer node i with j-$^{th}$ feature
$N_i$=Peer node i
Peer node i with k number of features can be expressed as:

$$N_i(x_i^1, x_i^2, \ldots, x_i^k) = (N_i(x_i^d), d=1,k) \quad (1)$$

For m number of peer nodes, an individual peer can have k number of features expressed as:

$$(N_i(x_i^d), d=1,k, i=1,m) \quad (2)$$

The features of a peer node expressed in $x_i^d$ can be qualitative or quantitative. For example, distance, delay, or link performance can be a quantitative feature and can be deduced using a mathematical model. Following, in one example, a self-organizing multi-character overlay (SOMCO) routing arithmetic scheme with a user's favorites and characters, features can be mapped into different logical dimensions. Accordingly, multi-dimension logical coordinates can be constructed from the results. With this, coordinates, distance, and neighbor list updating can occur through use of SOMCO.

Coordinates can include features in d-dimensional space as stated above. For distance, in at least some cases, additional measures can also be adopted to fulfill objectives. In one example, the distance $P(N_i, N_j)$ between two peer nodes $N_i$ and $N_j$ at time t can be defined using weighted factor $w_i$ as follows:

$$P(N_i, N_j) = \Sigma_{i=1}^{d} w_i \cdot |x_i^t - x_j^t| \quad (3)$$

It can be seen that the distance can also affect other features as well and the weighting factor $w_i$ can be selected for both qualitative and quantitative factors accordingly to satisfy objectives. Similarly, other factors can also be considered. With regard to the neighbor list, in the P2PSIP network, a node 210-260 of FIG. 2 can communicate with another node via its neighbors (e.g., node 210 of FIG. 2 communicates with node 230 of FIG. 2 by way of node 220 of FIG. 2). A node can store a neighbor's information in a routing table of the node. Node $N_1$ can be $N_1(n_1^1, n_1^2, \ldots, n_1^d)$, its neighbor node can be $N_k$, where $N_k(n_k^1, n_k^2, \ldots, n_k^d)$ can meet a standard that $N_1$ reaches $N_k$ via one hop. Another standard can be that coordinates are positive, such as:

$$n_i^j > n_1^i, 1 < i < k, 1 \leq j < d \quad (4)$$

If $n_1^j$ reaches a maximum (MAX) of the coordinates, the neighbor $n_i^j$ can reuse a minimum (MIN) and form one closed loop space. If multiple nodes meet these two standards (e.g., MAX and MIN), then node $N_1$ can order the distance $P(N_i, N_1)$ and choose top K nodes to be its neighbors. While the choosing node is part of the network 130 of FIG. 2, the node can use the distance $P(N_i, N_1)$ as at least part of an input for the context-aware key-based distribution hash table routing algorithm. When a node enters into the network 130 of FIG. 2, the entering node can obtain information regarding other nodes from bootstrap nodes and calculate distances. For this, the entering node can choose least k nodes as its neighbor(s). While a node receives a register message from another node, the receiving node can calculate a distance between this node and updates its neighbor list table.

Criteria for selection of RT (Real Time) P2PSIP/P2PVoIP peers in the application layer and the MANET network layer can complement one another as well as overlap one another. Therefore, a RT P2PSIP/VoIP key-based routing protocol (e.g., by way of the context-based algorithm) can be developed to meet the demands of the P2PSIP/VoIP application layer as well as complement the peer-to-peer MANET network routing layer.

In designing a hierarchical cluster-based MANET topology for providing scalability, a cluster-based design criteria set (one or more criterion) can be used. A cluster-based hierarchical topology can be scalable for large networks because of low overhead traffic that can be generated within a respective community of interests (COIs) confining routing broadcast traffic (e.g., limited in the respective clusters). Heterogeneous capabilities of nodes 210-260 of FIG. 2 can be accommodated and disruption caused by frequent node churn can be reduced (e.g., minimized). A set of peer nodes P can be part of the network 130 of FIG. 2 with P being:

$$P=\{p_i, 1 \leq i \leq N_p\} \quad (5)$$

An overlay network can be a logical network that connects a certain subset of P with:

$$0<|P^h|<|P^{(h-1)}|, \forall h>0, \{0 \leq h \leq H\} \quad (6)$$

and the overlay network can be height h that is denoted by $P^{(h)}$. Qualify of cluster (QoC) for a network (e.g., the network 130 of FIG. 2) can be guided by Intra-Cluster Cohesiveness and Inter-Cluster Separation with:

$$\varphi(c_i) = \text{Tightness of an individual cluster } c_i(c_i = c \text{ for simplicity}) \quad (7)$$

$$\varphi(c_i) = \varphi(c) \quad (8)$$

$$\varphi(c) = \text{skew}(H_c) = \frac{\Sigma_k (s_k - \mu_{S_c})^3}{|S_c|\sigma_{S_c}^3}, s_k \in S_c \quad (9)$$

where $$S_c = \left\{ s_k : 1 \leq k \leq \frac{|c|(|c|-1)}{2} \right\} \quad (10)$$

$$s_k = sim(d_i, d_j), d_i, d_j \in c \quad (11)$$

with the following definitions:
|c|=Number of objects in the cluster
sim (.)=A similarity measure between two objects
$S_c$=A set of pair-wise similarity between objects of cluster c
$H_c$=Histogram of similarities in the cluster={$h_i$: 1≤i≤B}
$h_i$=count($s_k$), $s_k \in S_c$, δ·(i−1)≤$s_k$<δ·(i)
B=Number of histogram bins
$h_i$=Count of similarities in bin i
δ=Bin width of the histogram
skew can be defined as:

$$\text{Skew} = \frac{\sum_i (x_i - \mu)^3}{N\sigma^3} \quad (12)$$

A positive skew can indicate a longer tail in a higher interval of a histogram, and vice versa. A negatively-skewed similarity histogram can indicate a tight cluster. Overall QoC measurement can be based, at least in part, on skewness of similarity histograms of individual clusters and can be derived as a weighted average of the individual clusters skew that are:

$$\varphi(C) = \frac{\sum_i |c_i|\varphi(c_i)}{\sum_i |c_i|}, c_i \in C \quad (13)$$

At peer i, a centroid of cluster k can be updated according to the following equation which favors tight and dense clusters for iteration t:

$$m_{ik}^t = \frac{\sum_j w_{jk}^{t-1} \cdot m_{jk}^{t-1}}{\sum_j w_{jk}^{t-1}}, j \in Q \quad (14)$$

where:
$w_{jk}$=weight of a cluster k at peer j=$\varphi(c_{jk}) \cdot |c_{jk}|$
$C_j^t$=Peers broadcast cluster centroid, skew, and size information at the end of iteration t
$C_j^t = (m_{jk}, \varphi_{jk}, |c_{jk}|)^t$, k∈[1, K]
K=Total number of clusters.

Figure 6:
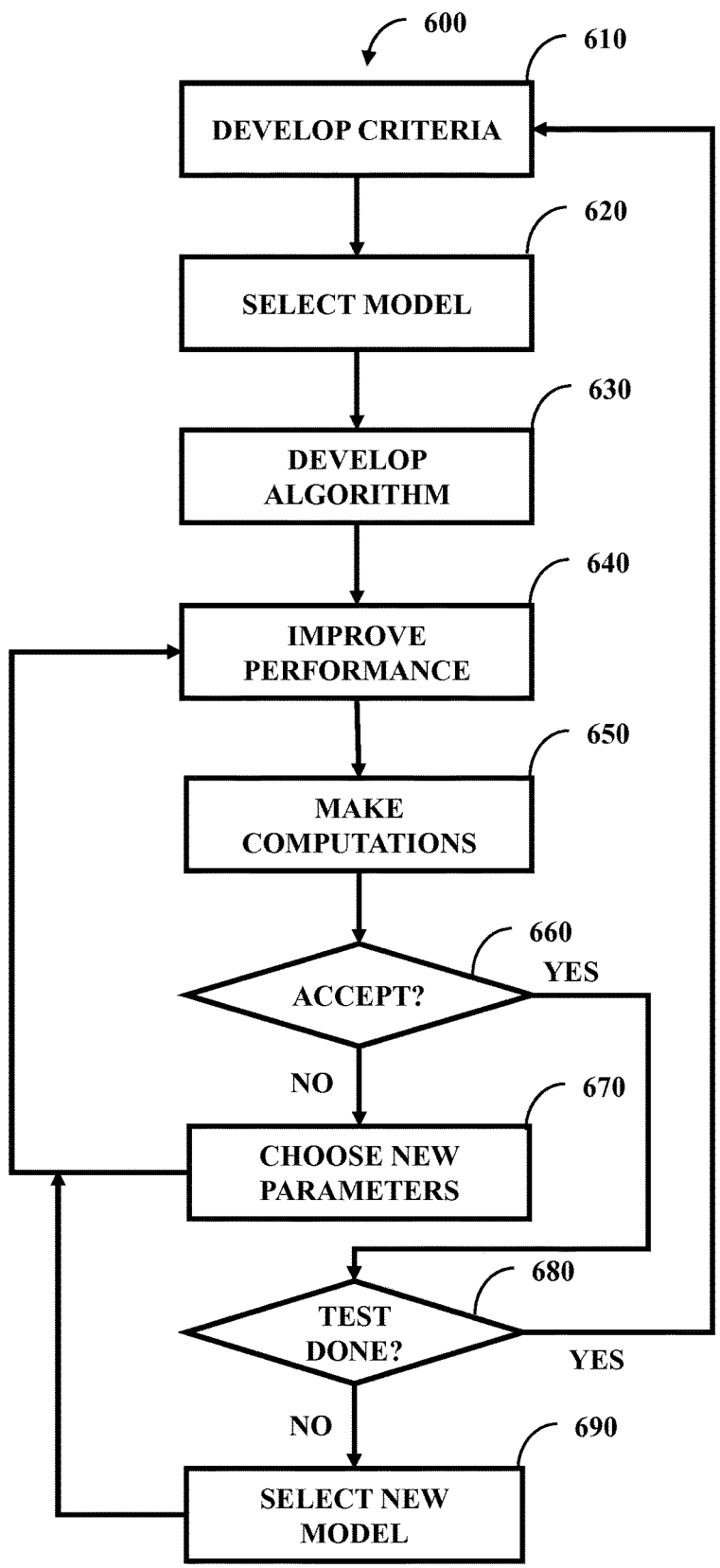
FIG. 6 illustrates one embodiment of a method comprising nine actions.

FIG. 6 illustrates one embodiment of a method 600 comprising nine actions 610-690. Some of the MANET nodes (e.g., ordinary nodes) can use an existing physical MANET routing protocol within a given cluster. Hierarchical MANET cluster-peer nodes can use the context-aware key-based distribution hash table routing algorithm to create the route scheme 150 of FIG. 1 for use among their peers, known as cluster heads (CH). The method 600 can be used to create the context-aware key-based distribution hash table routing algorithm. The context-aware key-based distribution hash table routing algorithm can function to meet real-time conversational audio/video media performances subject to resource constraints in various layers of the network 130 of FIG. 1.

At 610, peer selection criteria, including criteria based, at least in part, on meeting performance metrics (e.g., requirements) of a peer-to-peer VoIP, can be developed. At 620, a MANET mobility model for a given set of networking parameters (e.g., for a peer-to-peer VoIP application) can be selected. At 630, the context-aware key-based distribution hash table routing algorithm for the peer-to-peer ad hoc network 130 of FIG. 1 can be developed.

At 640, an improvement (e.g., optimization) can take place for end-to-end peer-to-peer VoIP communications over the peer-to-peer MANET. This improvement can be performed through varying speed of the selected MANET mobility model (e.g., when subjected to performance constrains using integrated and non-integrated design). At 650, computations can be made. Example computations can include computing optimum throughput and overhead traffic for algorithms used in creating the network 130 of FIG. 1. Along with these computations, the results of the computations can be used, such as in comparisons. Based on results of these computations, a check 660 can be performed to determine if the results are acceptable. If not, then new parameters can be selected at 670 and the method 600 can return to 640. If the results are acceptable, then check 680 can take place to determine if the number of desired mobility models are tested. If not, then the method 600 can return elsewhere (e.g., actions 640 or 620) and in one example a new model can be selected. If so, then the method 600 can end or repeat its functionality if beneficial.

Figure 7:
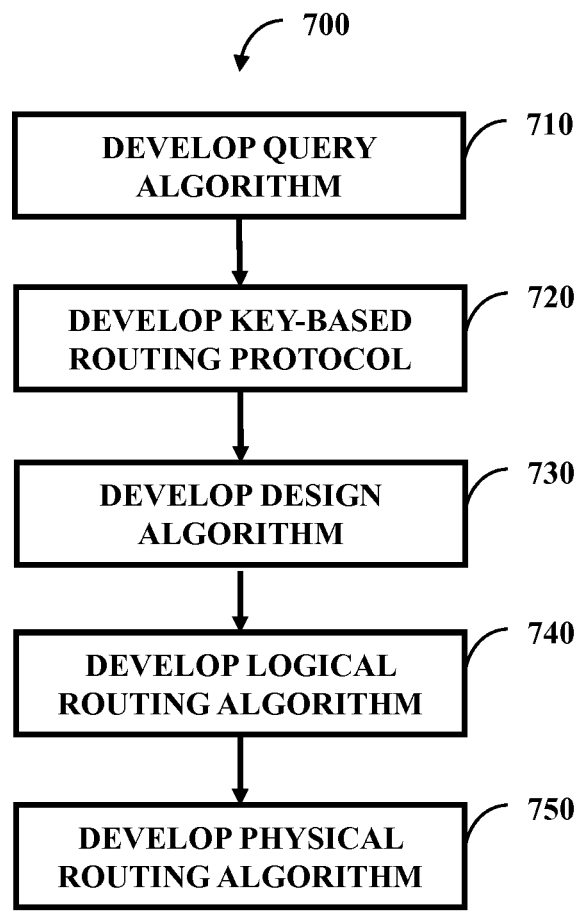
FIG. 7 illustrates one embodiment of a method comprising five actions.

FIG. 7 illustrates one embodiment of a method 700 comprising five actions 710-750. The method 700 can be considered a detailed explanation of action 630 of FIG. 6 and/or action 520 of FIG. 5. A final output produced from the method 700 can be the context-aware key-based distribution hash table routing algorithm. At 710, developing a peer-to-peer distributed hash table-based query algorithm (e.g., for VoIP peer/resource discovery) can take place. At 720, a peer-to-peer key-based routing protocol can be developed. This protocol can be for creation of logical peer-to-peer VoIP topology. At 730, developing a hierarchical cluster-based design algorithm can take place. This hierarchical algorithm can be a MANET design algorithm that can mimic logical peer-to-peer VoIP topology. At 740, developing a peer-to-peer distributed hash table-based logical routing algorithm can take place. The logical routing algorithm can be integrated with peer-to peer VoIP distributed-hash table/key-based routing for use among MANET cluster heads over the MANET network. At 750, developing a physical routing algorithm can take place that is integrated with distributed-hash table/key-based routing logical routing.

An analytical model can be used for the peer-to-peer MANET that can use a shortest path algorithm. For the analytical model, a multi-hop wireless MANET network (e.g., the network 130 of FIG. 2) with n logical transmitter/receiver pairs being used. The transmit power of a peer node can be denoted as $P_i$ and if there is N number of peers, then the transmit powers of peers can be $\{P_i, i=1, N\}$. In this multi-hop network, individual links along a flow's path can be considered for various schemes including power control since the transmission environment can be different on links with an end-to-end path.

For a Rayleigh fading channel, a power received from a peer transmitter j at peer receiver i is given by $P_{r,i}=G_{ij}F_{ij}P_j$, and the signal-to-interference ratio (SIR) for the peer receiver on the logical link, i, can be provided as follows:

$$SIR_i = (P_i G_{ii} F_{ii})/(\Sigma_{j \neq i}^N P_j G_{ij} F_{ij} + \eta_i) \quad (15)$$

where:
$G_{ij}$=Path gain encompassing antenna and coding gain from peer transmitter j to peer receiver i, and can be modeled as proportional to $l_{ij}^{-\gamma}$;
$l_{ij}$=distance between the transmitter and receiver;
$\gamma$=power fall-off factor;
$F_{ij}$=Rayleigh fading parameters (e.g., independent and exponentially distributed with unit mean); and
$\eta_i$=Noise power from peer receiver i.

The bit-error-rate (BER) for a peer receiver on a logical link i can also be expressed as a function of SIR for the Rayleigh fading scheme as follows:

$$BER_i = \frac{1}{2}\left(1 - \sqrt{\frac{SNR_i}{1 + SNR_i}}\right) \quad (16)$$

The data rate $R_i$ on the i-th link as a function of the SIR can be given by:

$$R_i = \frac{1}{T}\log_2(1 + K \times SIR_i) \cong \frac{1}{T}\log_2(K \times SIR_i) = >\frac{1}{T}\log_2(SIR_i) \quad (17)$$

where constant K is absorbed in $SIR_i$ for simplicity.

The data rate $R_i$ on the i-th link of a peer as a function of the BER can be written as follows:

$$R_i \cong \frac{1}{T}\log_2\left(K \bigg/ \left[1 + \frac{1}{(1-2BER_i)^2}\right]\right) \quad (18)$$

where T=Symbol period for M-ary Quadrature Amplitude Modulation (MQAM) as follows:

$$M = \frac{[-\phi_1 SIR]}{[\ln(\phi_2 BER)]} \quad (19)$$

where $\phi_1$, $\phi_2$, and BER are constants that depend on modulation type; and $$K = (-\emptyset_1)/[\ln(\emptyset_2 BER)] \quad (20)$$

K is also a constant and can be absorbed in $SIR_i$ for simplicity as explained above. Peer's Link Bandwidth (data rate) can be calculated with transmit power $P_t$ as follows:

$$R_b = \frac{\alpha P_t}{FkT_0(SNR_{link})} \quad (21)$$

and Peer's battery energy lifetime, $\tau$ can be:

$$\tau \leq \frac{E_b \rho_s}{R_i \rho_s^{min}} \quad (22)$$

where
$E_b$=Peer's batter energy;
$R_i$=Peer's bit rate as shown above;

$$\rho_s = MANET \text{ Peer Node Density} = \frac{N}{A};$$

N=Total number of peer nodes as described earlier inside a planner surface area A;

$$\rho_s^{min} = \text{Minimum Energy Density} = \frac{kFT_0}{\alpha}[SNR_{link}^{min}];$$

k=Boltzmann's constant;
F=Noise figure of the peer's receiver;
$T_0$=Room temperature ($T_0$=300 K);
$SNR_{link}^{min}$=Peer link's minimum signal to noise ratio and can be calculated using equations shown earlier and a is shown below:

$$\alpha = \frac{G_t G_r c^2}{(4\pi)^2 f_1 f_c^2} \quad (23)$$

$G_t$ and $G_r$ are the transmitter and receiver antenna gains of the peer respectively;
c=Speed of light;
$f_1$=Loss factor ($\geq 1$); and $f_c$=Carrier frequency.

Link break time between two peers, $t_{break}$, can be defined as:

$$t_{break} = \frac{d_{max}}{v_{max}} \quad (24)$$

$d_{max}$=Maximum distance between two peers and
$v_{max}$=Maximum relative velocity between two peers
Maximum distance between two peers, $d_{max}$ is a function the regular distance d between the two peers:

$$d_{max}=f(d)$$

Distance between the two peers, d, can be defined as:

$$d = \left[\frac{\alpha P_t}{P_r}\right]^{1/\gamma} \quad (25)$$

$\gamma$=Power fall-off factor.

Maximum relative velocity between two peers, $v_{max}$, can be a function of a regular relative velocity, v between the two peers such that:

$$v_{max}=f(v) \quad (26)$$

Relative velocity v between two the two peers i and j can be:

$$v=f(v_i,v_j) \Rightarrow \vec{v}=\vec{v_i}-\vec{v_j} \quad (27)$$

where $v_i$=Mobility (velocity) pattern of peer i (e.g. deterministic, random walk, random way point, semi-Markov smooth, random Gauss-Markov, time variant mobility, etc.) and $v_j$=Mobility (velocity) pattern of peer j (e.g. deterministic, random walk, random way point, semi-Markov smooth, random Gauss-Markov, time variant mobility, etc.)

A utility function can be used for selection of a MANET cluster head level ($CHL_i$). The $CHL_i$ of peer i can be calculated within some time period (e.g., T ) using a set of rules based on quality of cluster [$\varphi(c_i)$], number of peer-to-peer session IP (P2PSIP)/P2PVoIP service features ($s_i$), average relative velocity between the connecting peers ($V_i$), and average distance between the connecting peers ($D_i$). Individual peers can compute and broadcast its $CHL_i$ along with its $\varphi(c_i)$, $s_i$, $V_i$, and $D_i$. A peer with a beneficial $CHL_i$ (e.g., highest $CHL_i$) can be selected as a cluster head. If the selected cluster head is a member of another cluster, the peers can choose the second highest, and so on.

$CHL_i$ can be defined within a time period, T as follows:

$$CHL_i=W_1[\varphi(c_i)]+W_2[s_i]+W_3[V_i]+W_4[D_i] \quad (28)$$

and $$\Sigma_{i=1}^4 W_i=1, \quad (29)$$

$W_i$=Weight and each weighting factor are chosen in accordance with the model needs. The goal is to improve upon the initial clustering logic to obtain better stability over the simulation time.

$s_i=\Sigma_i^k SF_i$; SF=P2PSIP/P2PVoIP service feature, which is a Boolean expression; if Yes, SF=1; if No, SF=0; k=total number of P2PSIP/P2PVoIP service features.

$V_i=[\Sigma_{i=1}^n RV_i]/n$; RV=Relative of the connecting peer [shown in Equation (10)]; n=total number of connecting peers within the time period T.

$D_i=[\Sigma_{i=1}^n d_i]/n$; d=distance between the connecting peers [shown in Equation (9)]; n=total number of connecting peers within the time period T.

Above, contexts of the P2PSIP application layer and the MANET network layer were discussed. These can be translated in terms of virtual coordinates of d-dimension space and be used to calculate virtual distances between the nodes 210-260 of FIG. 2. In one example, the nodes 210-260 can have varying power availability and this variable can be an example of a context considered—a context of resource availability. It should be noted that various other contexts can be considered, such as varying bandwidth, time-to-live, or computing power.

A mathematical model can indicate that information about nodes' distances, nodes' resource levels, security, call identification, Uniform Resource Locator, nodes' resource distances, internodes' link/path bandwidth resource levels, and internodes' link/path bandwidth resource distances should be communicated between the nodes 210-260 of FIG. 2. This information can be piggybacked in a primary network message (e.g., done for efficiency where possible if independent control messages are not created).

In one example, a node x (e.g., node 210 of FIG. 2) can maintain a prospective links list which contains a list of the k nodes (e.g., a list of best nodes in terms of resource distance for individual finger intervals $B_{x,i}$ $i \in \{1, 2, \ldots, m\}$ and the notations x, y, and $n_i$ can be interchangeable). Thus, at k nodes in $B_{x,i}$ the nodes can be saved via their nodeIDs and distances to x. When receiving a message from sender y, node x can use y's context coordinates to determine a virtual distance and update its prospective links list accordingly as shown in the algorithm below:

```
procedure ProspectiveLink(nodeInfo)
    finger = getFingerInterval(nodeInfo.key)
    dist = getResourceDist(nodeInfo.interNodeLinkDijkstraShortestPath)
    if prospectiveLinkList.contains(finger, nodeInfo.key) then
        prospectiveLinkList.updateNode(finger, dist, nodeInfo)
    else if dist < prospectiveLinkList.getFarthestLinkDist(finger) or
           propectiveLinkList.size(finger) < k then
        prospectiveLinkList.addNode(finger, dist, nodeInfo)
        while prospectiveLinkList.size(finger) > k do
            prospectiveLink.List.removeFarthestLink(finger)
        end while
    end if
end procedure
```

Additionally, an algorithm can be used for establishing and/or maintaining fingers of distribution hash table routing. In one example, a finger table for an individual finger x can be maintained. f[i] in each $B_{x,i}$ for $i \in \{1, 2, \ldots, m\}$ (x, y, and $n_i$ can be used interchangeably). With this example, if prospective links contain at least one entry for $B_{x,i}$, then the entry with the smallest resource distance can be contacted with a finger request. Otherwise, an owner (e.g., successor) of key $x_{ID}+2^{i-1}$ can be contacted as a Chord as shown in the following algorithm:

```
procedure MaintainFinger(finger)
    lookupKey = myKey + getOffset(finger)
    if prospectiveLinkList.size(finger) > 0 then
        listEntry = prospectiveLinkList.getClosestEntry(finger)
        lookupKey = listEntry.key
        prospectiveLink.List.removeUsedEntry(listEntry)
    end if
    sendLookup(lookupKey)
end procedure
```

Following the use of an entry for a finger request, the entry can be deleted from a prospective links list. This deletion can occur as soon as the entry is used for a finger request.

The context-aware distribution hash table routing algorithm can be integrated with MANET Physical Routing. Distributed hash table routing can be efficient for dealing with churns of the MANET as mobile nodes move from one place to another as well as with intelligence of VoIP calls so that destination peers can be reached in beneficial (e.g., optimal) ways. In a given flat distributed hash table, context-aware distribution hash table lookup routing can be performed greedily (e.g., identical to unidirectional routing). The following can be definitions for scalable distributed has table routing:

finger[i]: First node on circle that succeeds $(n_{i[ID]}+2^{i-1})$ mod $2^m$, $1 \leq i \leq m$ successor: The next node on the identifier circle; finger[i].nodeID predecessor: The previous node on the identifier circle while the following can be an algorithm for obtaining an input:

```
procedure FindSuccessor(id)
    nodeID.FindSuccessor(id)
    if (id ∈ (nodeID, successor])
        return successor;
    else
        nodeID' = closest.ProceedingNoe(id);
        return nodeID'.findSuccessor(id);
end procedure
```

To route information, MANET physical routing protocols can be used (e.g., OSPF-MDR (Open Shortest Path First-medium data rate) or OLSR (Optimized Link State Routing)). Aspects disclosed herein can use various protocols and clusters can run different protocols. A context aware unicast routing protocol can be used between cluster heads forming a large-scale MANET backbone network.

For a node to join the MANET network, the node can be subjected to entry requirements. Example requirements can be have valid network coordinates, choosing a nodeID, having the node resource level, having contact with one participating node, and/or computing link/path resource level in coordination with participation node. An individual node can update its prospective links continuously and can use the algorithm that begins with 'procedure MaintainFinger(finger)' periodically for performing finger maintenance to establish and maintain its fingers. The context-aware distribution hash table can process node failures and a node failure can cause removal of a prospective link once a node notices that it has failed. However, repetition can be used to ensure data availability for at least some node failures.

Figure 8:
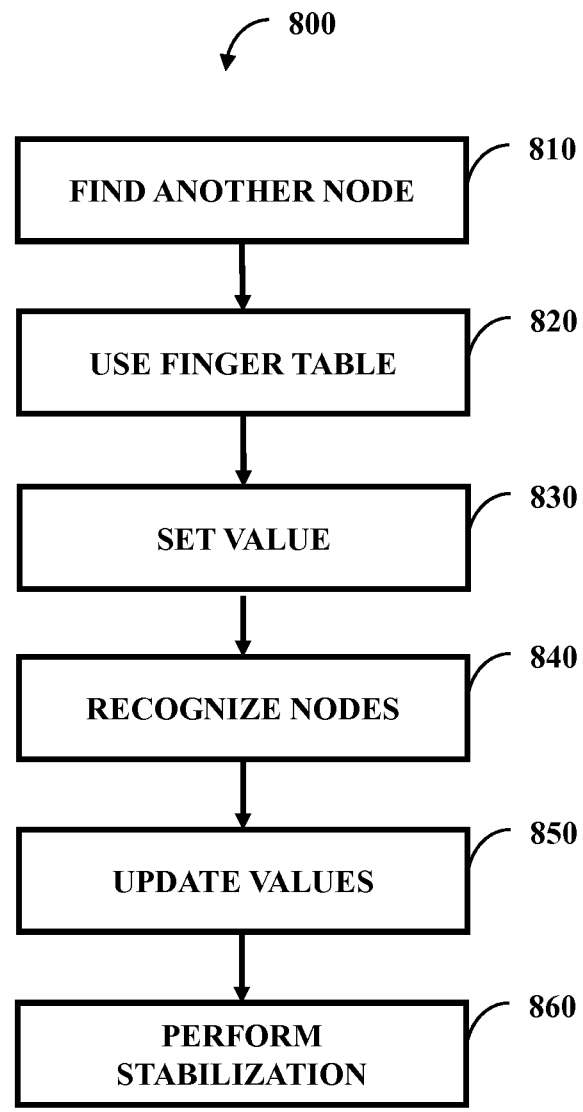
FIG. 8 illustrates one embodiment of a method comprising six actions.

FIG. 8 illustrates one embodiment of a method 800 comprising six actions 810-860. The method 800 can be performed by at least part of the network 130 of FIG. 2 (e.g., for joining the network 130 of FIG. 2 or leaving the network 130 of FIG. 2). At 810, a new node ($n_x$) (e.g., node 210 of FIG. 2) can find another node ($n_y$) (e.g., node 220 of FIG. 2) already in the network 130 of FIG. 2. At 820, node $n_y$ can uses its finger table to find the successor of $n_x$ using context-aware routing mechanisms discussed herein. At 830, $n_x$ can set its successor to the value returned by $n_y$. At 840, newly joined nodes can be recognized by another node checking whether its successors and predecessors remain during periodic stabilization. At 850, respective nodes can update their successor values to reflect a latest change. At 860, individual nodes in the network 130 of FIG. 2 perform stabilization on nodes in the finger table. Note that while plural nodes are discussed, actions disclosed herein can be performed for an individual node.

The MANET can experience frequent node joins, failures, movements, and changing resource levels. These experiences can facilitate links being updated frequently. In order to cope with these updating links, techniques similar to those practiced in a location-aware distribution hash table can be used.

Figure 9:
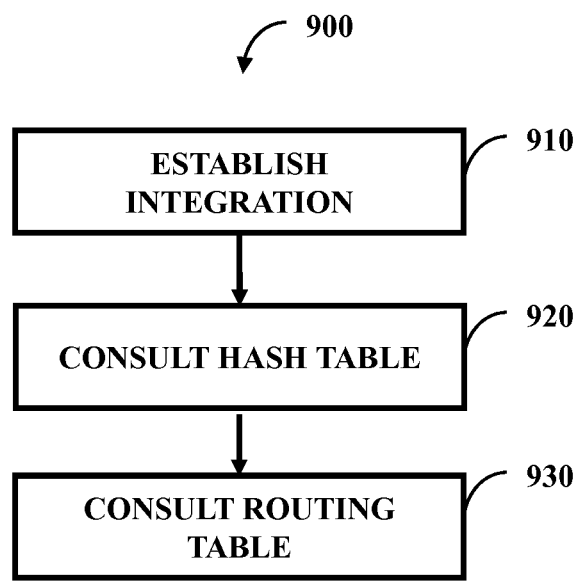
FIG. 9 illustrates one embodiment of a method comprising three actions.

FIG. 9 illustrates one embodiment of a method 900 comprising three actions 910-930. A context-aware distribution hash table can be used to route packets based on an overlay identification where a final (e.g., physical) target node can be unknown. Due to this unknown, at 910, an integration can be established between an overlay of the context-aware distribution hash table and a physical routing. If a context-aware distribution hash table node (e.g., node 230 of FIG. 2) wants to send a packet to a specific key, at 920, the node can consult its Context-Aware distribution hash table overlay routing table to determine a closest prefix match as discussed above. At 930 the node can consult its MANET physical routing (e.g. OSPF-MDR, OLSR, or others) table for the route to execute this overlay hop. Similarly, intermediate nodes on a physical path of an overlay hop consult their MANET physical routing table for the corresponding next physical hop (e.g., travel from node 230 of FIG. 2 to node 210 of FIG. 2 can cause the node 220 of FIG. 2 to perform a check). While actions of the method 900 are discussed as being performed by a node, other actors can perform one or more actions of FIG. 9.

A successor node list for individual nodes can be kept up-to-date. A stabilization protocol can be used for this updating. An individual node can run the stabilization protocol periodically in the background to keep the successor node list up to date. The protocol can rely on nodes maintaining a successor list of size q, with q being a positive integer, containing the node's first q successors. If the successor node does not respond or fails to a query, then a requesting node can contact a next node on its successor list. The system 100 of FIG. 1 can be made more robust by increasing q at the expense of increasing the routing table size and hence the processing cost.

The MANET physical routing (e.g. OSPF-MDR, OLSR, or others) can be such that the node's Internal Protocol address can remain unchanged if it is leased even though the node moves in the network 130 of FIG. 1. Node mobility can be transparent to upper layers and the network 130 of FIG. 1 can function without mobility management. Otherwise, a mechanism can be used to assign Internal Protocols for MANETs. However, in mobile ad hoc networks, nodes' movements can however cause loss of connectivity. To the overlay layer this can appear like some nodes have left the network or the network has split and a mechanism (e.g., algorithm) can be used to correct the appearance.

With this, context-aware distribution hash table routing algorithms and mathematical models can be used in P2PSIP over peer-to-peer MANET. Cluster-based topology can be used for the large-scale MANET for making it scalable. This scalable configuration can be a prime candidate for using the context-aware distribution hash table routing (e.g., by way of the context-aware key-based distribution hash table routing algorithm) among the cluster heads. The MANET backbone network can include the cluster heads and can use a unicast routing protocol for making it further scalable (e.g., because the MANET physical routing protocols used in broadcast routing can create high overheads). The context-aware key-based distribution hash table routing algorithm can be used with the cluster-based MANET backbone and/or the P2PSIP application layer. Physical routing protocols can be used internal to the clusters of the MANET.

While the methods disclosed herein are shown and described as a series of blocks, it is to be appreciated by one of ordinary skill in the art that the methods are not restricted by the order of the blocks, as some blocks can take place in different orders. Similarly, a block can operate concurrently with at least one other block.

What is claimed is:

1. A non-transitory computer-readable medium, communicatively coupled to a processor, configured to store a command set executable by the processor to facilitate operation of a component set, the component set comprising:
   a context component configured to gather a contextual information set for a peer-to-peer ad hoc network; and
   a route component configured to create a route scheme for information communication in the peer-to-peer ad hoc network, where the creation of the route scheme is based, at least in part, on the contextual information set.

2. The non-transitory computer-readable medium of claim 1, where the route component uses a context-aware key-based distribution hash table routing algorithm to create the route scheme.

3. The non-transitory computer-readable medium of claim 2,
   where the peer-to-peer ad hoc network comprises node clusters,
   where the individual node clusters comprise a cluster head and at least one ordinary node,
   where the route scheme is a first route scheme for information communicated from one cluster head to another, and
   where the route component is configured to create a second route scheme for information communicated from one ordinary node to another ordinary node within an individual node cluster through use of a non-context-aware key-based distribution hash table routing algorithm.

4. The non-transitory computer-readable medium of claim 1,
   where the peer-to-peer ad hoc network is a mobile peer-to-peer ad hoc network and
   where the contextual information set is, at least in part, information of a mobile ad hoc layer of the peer-to-peer ad hoc network.

5. The non-transitory computer-readable medium of claim 4,
   where the peer-to-peer ad hoc network is a decentralized peer-to-peer ad hoc network and
   where the peer-to-peer ad hoc network is a mobile Voice-over-Internet Protocol peer-to-peer ad hoc network.

6. The non-transitory computer-readable medium of claim 1, where the contextual information set, at least in part, is information of a peer-to-peer session initial protocol layer of the peer-to-peer ad hoc network.

7. The non-transitory computer-readable medium of claim 1, the component set comprising:
   an identification component configured to identify a transmission node of the peer-to-peer ad hoc network and a destination node of the peer-to-peer ad hoc network;
   an evaluation component configured to evaluate a first node of the peer-to-peer ad hoc network and evaluate a second node of the peer-to-peer ad hoc network to produce an evaluation result; and
   a selection component configured to make a selection of the first node, the second node, or a combination thereof,
   where the selection is based, at least in part, on the evaluation result,
   where the evaluation component is configured to evaluate the first node and the second node with regard to the contextual information set, and
   where the route scheme indicates a path from the transmission node to the destination node by way of the node indicated in the selection.

8. The non-transitory computer-readable medium of claim 1, where the contextual information set is, at least in part, quantitative information of the peer-to-peer ad hoc network, qualitative information of the peer-to-peer ad hoc network, or a combination thereof.

9. A method, comprising:
   obtaining a data set about a peer-to-peer network; and
   developing, by way of a development processor, a context-based integrated peer-to-peer algorithm for the peer-to-peer network through use of the data set;
   where the context-based integrated peer-to-peer algorithm forwards route traffic management in the peer-to-peer network.

10. The method of claim 9, where developing the context-based integrated peer-to-peer algorithm comprises developing a peer-to-peer distributed hash table-based query algorithm.

11. The method of claim 9, where developing the context-based integrated peer-to-peer algorithm comprises developing a peer-to-peer key-based routing protocol.

12. The method of claim 9, where developing the context-based integrated peer-to-peer algorithm comprises developing a hierarchical cluster-based design algorithm.

13. The method of claim 9, where developing the context-based integrated peer-to-peer algorithm comprises developing a peer-to-peer distributed hash table-based logical routing algorithm.

14. The method of claim 9, where developing the context-based integrated peer-to-peer algorithm comprises developing a physical routing algorithm.

15. The method of claim 9,
   where developing the context-based integrated peer-to-peer algorithm comprises developing a peer-to-peer distributed hash table-based query algorithm,
   where developing the context-based integrated peer-to-peer algorithm comprises developing a peer-to-peer key-based routing protocol,
   where developing the context-based integrated peer-to-peer algorithm comprises developing a hierarchical cluster-based design algorithm,
   where developing the context-based integrated peer-to-peer algorithm comprises developing peer-to-peer distributed hash table-based logical routing algorithm, and
   where developing the context-based integrated peer-to-peer algorithm comprises developing a physical routing algorithm.

16. The method of claim 9, comprising:
   using the context-based integrated peer-to-peer algorithm to route traffic in the peer-to-peer network,
   where the context-based integrated peer-to-peer algorithm considers quantitative information about the peer-to-peer network.

17. The method of claim 9, comprising:
   using the context-based integrated peer-to-peer algorithm to route traffic in the peer-to-peer network, where the context-based integrated peer-to-peer algorithm considers qualitative information about the peer-to-peer network.

18. A system, comprising:

a non-transitory computer-readable medium configured to retain a context-aware key-based distribution hash table routing algorithm; and a processor configured to use the context-aware key-based distribution hash table routing algorithm to create an initiation protocol for a mobile peer-to-peer ad hoc network.

19. The system of claim 18, where the peer-to-peer ad hoc network comprises node clusters, where the individual node clusters comprise a cluster head and at least one ordinary node, where the processor uses the context-aware key-based distribution hash table routing algorithm to create an initiation protocol for communication between cluster heads, and where information communication between ordinary nodes within an individual node cluster is accomplished by way of a non-context-aware key-based distribution hash table routing algorithm employed to create a within-cluster initiation protocol.

20. The system of claim 18, where the processor is configured to output the initiation protocol such that the mobile peer-to-peer ad hoc network employs the initiation protocol.

\* \* \* \* \*